(12) United States Patent
Bruneau et al.

(10) Patent No.: US 9,670,085 B2
(45) Date of Patent: Jun. 6, 2017

(54) PROCESS AND MACHINE FOR MANUFACTURING A HOLLOW ARTICLE MADE OF THIN GLASS

(71) Applicant: POCHET DU COURVAL, Paris (FR)

(72) Inventors: Antoine Bruneau, Eu (FR); Nicolas Castex, Asnieres sur Seine (FR); Denis Cavallucci, Otterswiller (FR); Sylvie Legastelois, Asnieres sur Seine (FR); Olivier Perrin, Chatillon (FR)

(73) Assignee: Pochet Du Courval, Paris (FR)

( * ) Notice: Subject to any disclaimer, the term of this patent is extended or adjusted under 35 U.S.C. 154(b) by 0 days.

(21) Appl. No.: 14/430,027

(22) PCT Filed: Sep. 17, 2013

(86) PCT No.: PCT/EP2013/069257
§ 371 (c)(1),
(2) Date: Mar. 20, 2015

(87) PCT Pub. No.: WO2014/044669
PCT Pub. Date: Mar. 27, 2014

(65) Prior Publication Data
US 2015/0246838 A1 Sep. 3, 2015

(30) Foreign Application Priority Data

Sep. 21, 2012 (FR) ...................................... 12 58894

(51) Int. Cl.
*C03B 9/347* (2006.01)
*C03B 9/32* (2006.01)
(Continued)

(52) U.S. Cl.
CPC .............. *C03B 9/347* (2013.01); *A45D 34/02* (2013.01); *C03B 9/32* (2013.01); *C03B 9/3663* (2013.01); *C03B 9/3841* (2013.01); *C03B 9/46* (2013.01)

(58) Field of Classification Search
CPC ......... C03B 9/347; C03B 9/32; C03B 9/3663; C03B 9/46; C03B 9/3841
See application file for complete search history.

(56) References Cited

U.S. PATENT DOCUMENTS 2,725,683 A * 12/1955 Lockhart ................. C03B 9/165
65/261
4,781,955 A 11/1988 Noe
(Continued)

FOREIGN PATENT DOCUMENTS

FR 1 125 923 A 11/1956
GB 2 436 104 A 9/2007
(Continued)

OTHER PUBLICATIONS

International Search Report for International App. No. PCT/EP2013/069257 issued Sep. 17, 2013.
(Continued)

*Primary Examiner* — Queenie Dehghan
(74) *Attorney, Agent, or Firm* — Knobbe Martens Olson & Bear LLP

(57) ABSTRACT

The invention relates to a process for manufacturing a hollow glass article comprising at least one thin side wall (42), in which process:
  at least one parison of molten glass is introduced into a blank mold,
  a blank of the article is formed in the blank mold from said parison, (Continued)

the blank of the article is transferred into a finishing mold, and the article is formed in the finishing mold.

During forming of the article, excess glass is directed towards the exterior of the side wall of the article to form a convex bulge (43) and the bulge is removed to give the side wall of the article a substantially constant thickness.

The invention also relates to a corresponding machine and product.

5 Claims, 7 Drawing Sheets

(51) Int. Cl.
*C03B 9/36* (2006.01)
*C03B 9/38* (2006.01)
*C03B 9/46* (2006.01)
*A45D 34/02* (2006.01)

(56) References Cited

U.S. PATENT DOCUMENTS

| 5,183,673 A | * | 2/1993 | Schurman | B29C 49/48 |
| | | | | 425/522 |
| 5,713,975 A | * | 2/1998 | Schonfeld | C03B 11/07 |
| | | | | 65/104 |
| 5,876,478 A | | 3/1999 | Imamura et al. | |

FOREIGN PATENT DOCUMENTS

| JP | 2004 018306 A | 1/2004 |
| JP | 2004 238242 A | 8/2004 |
| WO | WO 2012/120119 | 9/2012 |
| WO | WO 2014/044669 A1 | 3/2014 |

OTHER PUBLICATIONS

Written Opinion for International App. No. PCT/EP2013/069257 issued Sep. 17, 2013.

* cited by examiner

PROCESS AND MACHINE FOR MANUFACTURING A HOLLOW ARTICLE MADE OF THIN GLASS

This application is the U.S. National Phase under 35 U.S.C. §371 of International Application No. PCT/EP2013/069257, filed Sep. 17, 2013, designating the U.S., and published in French as WO 2014/044669 on Mar. 27, 2014, which claims priority to French Patent Application No. 1258894, filed Sep. 21, 2012.

The present invention relates to a process and machine for manufacturing a hollow article made of thin glass, for example a bottle or any other article of that type.

The invention also relates to a hollow glass article obtained using this process.

BACKGROUND OF THE INVENTION

Field of the Invention

In general, the manufacture of hollow glass articles, for example bottles, must meet various constraints, in particular shape constraints, for example the position of the neck, manufacturing tooling constraints, for example for stripping, constraints related to distribution of the glass and the weight of the glass, and specific packaging-related constraints.

Description of Related Art

One known method for manufacturing this type of article consists of introducing at least one parison of molten glass into a blank mold at a specific temperature and preforming the article from the parison in the blank mold by injecting a pressurized gas, in particular such as air, into the blank mold.

The blank of the article thus produced is transferred into a finishing mold and the article is definitively formed in a finishing mold by also injecting a pressurized gas.

To date, hollow glass articles, and more particularly bottles designed for perfumery and cosmetics, have been made with thick glass distributions, which is perceived as particularly aesthetically appealing and contributes to conveying an image of luxury. The perfume bottles of the prior art have walls with a thickness exceeding 3 mm. Yet the current trend is to produce hollow glass articles with practically invisible glass walls, in order to convey an image of lightness, refinement, elegance and apparent fragility.

To obtain this output on a hollow glass article that can be industrialized, several conditions must be met, namely:
  very fine wall thicknesses,
  the most regular possible glass distributions to avoid disrupting perception by the eye, and
  a sufficient mechanical strength for handling of the article.

With the aforementioned method, the adjustment of the blank mold and the geometry of the blank, excess glass may remain on the walls of said article.

This excess forms a curved overthickness inside the article that specialists refer to as a "marloquette" or "policeman's hat". This overthickness disrupts the regularity of the glass distribution.

Furthermore, in light of the thinness of the walls of the article, the glass distribution constraints impose a much faster manufacturing rhythm than those currently used for articles with thicker walls. A gaseous interface forms between the blank and the walls of the finishing mold and is imprisoned during the blowing phase. This interface cannot be discharged due to a very short amount of time, thereby causing a deformation of the main faces of the article.

The invention aims to propose a process and a machine for manufacturing a thin hollow glass article that avoid these drawbacks.

The invention therefore relates to a process for manufacturing a hollow glass article comprising at least one thin side wall, in which process:
  at least one parison of molten glass is introduced into a blank mold,
  a blank of the article is formed in the blank mold from said at least one parison,
  the blank of the article is transferred into a finishing mold, and
  the article is formed in the finishing mold,
wherein, during forming of the article in the finishing mold, excess glass is directed towards the exterior of the side wall of the article to form a convex bulge and the bulge is removed to give the side wall of the article a substantially constant thickness.

BRIEF SUMMARY OF THE INVENTION

According to specific embodiments, the manufacturing process may include one or more of the following features, considered alone or according to any technically possible combination(s):
  the manufactured hollow article comprises a second thin side wall, and during forming of the article in the finishing mold, excess glass is directed towards the exterior of the second side wall of the article in order to form a second convex bulge and the second bulge is removed to give the second side wall of the article a substantially constant thickness;
  the manufactured hollow article comprises a thin bottom, and during forming of the article in the finishing mold, excess glass is directed towards the exterior of the bottom of the article in order to form a convex bulge, and that bulge is removed to give the bottom of the article a substantially constant thickness;
  during forming of the article in the finishing mold, the gas forming between the side wall of the article and an inner wall of the finishing mold is channeled towards the exterior of that finishing mold;
  the exterior bulge of the side wall of the article is removed by at least one cutting operation, followed by at least one polishing operation for the exterior face of the side wall of the article.

The invention also relates to a machine for manufacturing a hollow glass article comprising at least one thin side wall, said machine comprising:
  at least one molten glass parison distributor,
  a blank mold comprising a cavity designed to successively receive at least one parison of molten glass,
  means for forming a blank of said article in the blank mold,
  means for transferring the blank into a cavity of the finishing mold,
  means for forming the article in the finishing mold,
characterized in that the cavity of the finishing mold comprises at least one side part provided with a concave cavity to form, on the side wall of the article, a convex bulge directed towards the exterior of the article, and in that the machine comprises means for removing the bulge to give the side wall of the article a substantially constant thickness.

According to specific embodiments, the manufacturing machine may include one or more of the following features, considered alone or according to any technically possible combination(s):
  the article further comprising a second thin side wall, the cavity of the finishing mold comprises a second side part provided with a second concave cavity to form, on the second side wall of the article, a second convex bulge directed towards the exterior of said article, and the machine comprises means for eliminating the second bulge to give the second side wall of the article a substantially constant thickness;

the article further comprising a thin bottom, the cavity of the finishing mold comprises a bottom provided with a concave cavity to form, on the bottom of the article, a convex bulge directed towards the exterior of said article, and the machine comprises means for eliminating said bulge to give the bottom of the article a substantially constant thickness;

the finishing mold comprises at least one vent to channel gas forming between the side wall of the article and an inner wall of the finishing mold towards the exterior of said finishing mold;

the machine comprises means for cutting the exterior bulge of the side wall of the article and means for polishing the exterior face of the side wall of said article.

The invention also relates to a hollow glass article comprising at least two side walls and a bottom, obtained using the process as described above, wherein the two side walls have a thickness comprised between 0.2 mm and 6 mm, preferably between 0.5 mm and 3 mm, still more preferably close to approximately 1 mm, and wherein the bottom has a thickness comprised between 1 mm and 6 mm, preferably between 1.5 mm and 4 mm, the outer faces of the bottom and the two side faces being polished so that the bottom has a substantially constant thickness and the side faces have a substantially constant thickness.

BRIEF DESCRIPTION OF THE SEVERAL VIEWS OF THE DRAWINGS

The features and advantages of the invention will appear upon reading the following description, provided as an example, and done in reference to the appended drawings, in which.

Figure 8:
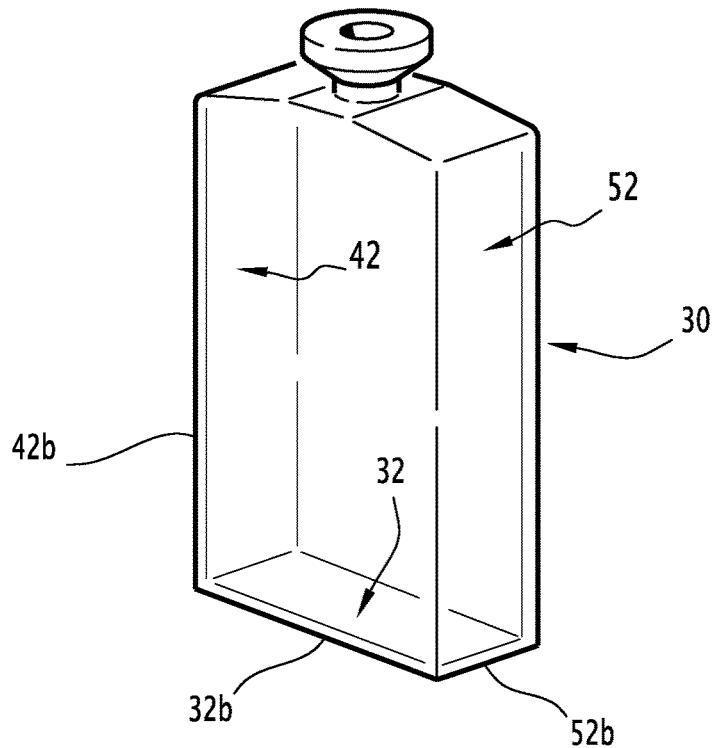
FIG. 8 is a diagrammatic perspective view of the final hollow glass article.

Hereinafter, the machine for carrying out the process according to the invention will be described for the manufacture of a hollow glass article 30, for example a bottle with a generally parallelepiped shape comprising side walls, including two side walls 42, 52 that for example form the two small sides of the article 30 and are advantageously substantially parallel, and a bottom 32, as shown in FIG. 8. The side walls 42, 52 have a thickness comprised between 0.2 mm and 6 mm, preferably between 0.5 mm and 3.0 mm, and still more preferably a thickness of approximately 1 mm. The bottom 32 has a thickness comprised between 1 mm and 6 mm, preferably between 1.5 mm and 4.0 mm.

The ranges provided above define the relative notion of "thin", for the side faces 42, 52 and for the bottom 32, respectively.

DETAILED DESCRIPTION OF THE INVENTION

Of course, this machine also makes it possible to manufacture hollow articles with various shapes, comprising thin walls.

Figure 1:
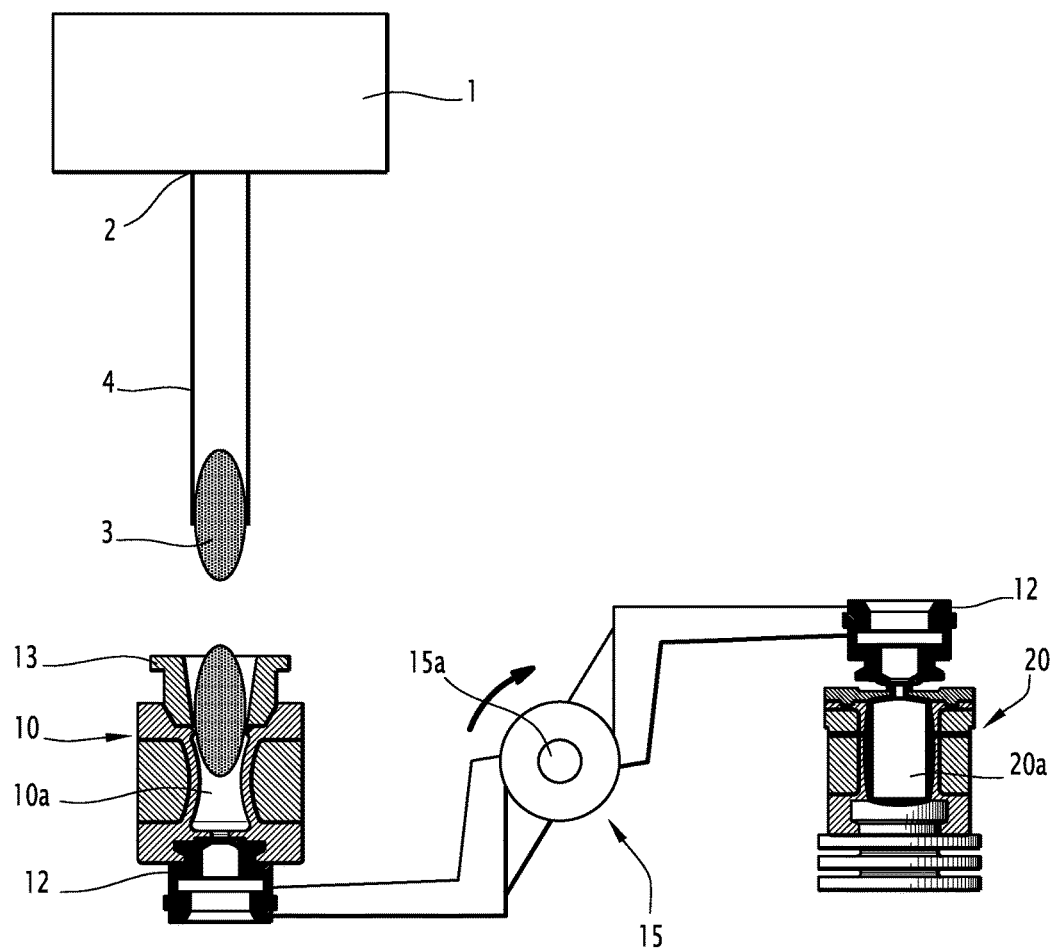
FIG. 1 is a diagrammatic view of part of a machine for manufacturing a thin hollow glass article, according to the invention.

As shown in FIG. 1, the machine comprises a molten glass distributor 1 placed between a furnace, not shown, and the blank mold designated as a whole by reference 10.

The distributor 1 of a known type delivers, at the outlet of a pouring orifice 2, a parison 3, which is traditionally cut by shears, not shown.

At the outlet of the distributor 1, the parison 3 falls into a conduit 4 that brings it into the blank mold 10 comprising a cavity 10a to form a blank 5. To that end, the cavity 10a of the blank mold 10 comprises a funnel 13 at its inlet.

Figure 2:
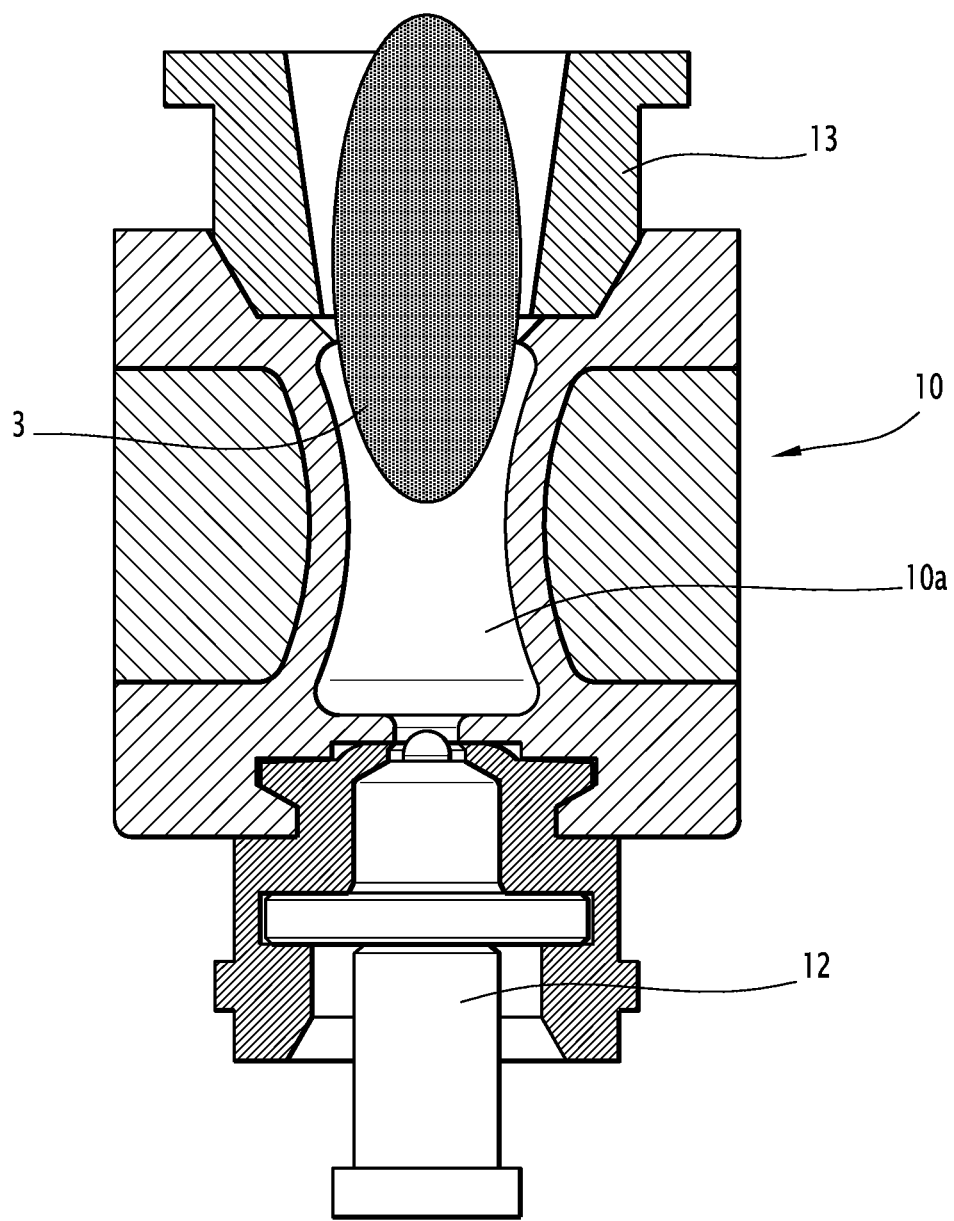
FIGS. 2 to 6 are diagrammatic vertical sectional views respectively showing the blank mold and the finishing mold of the machine, according to the invention.

As diagrammatically shown in FIG. 2, the lower portion of the blank mold 10 comprises a blowing nozzle 12 connected to a device supplying pressurized gas, for example air, not shown.

Figure 3:
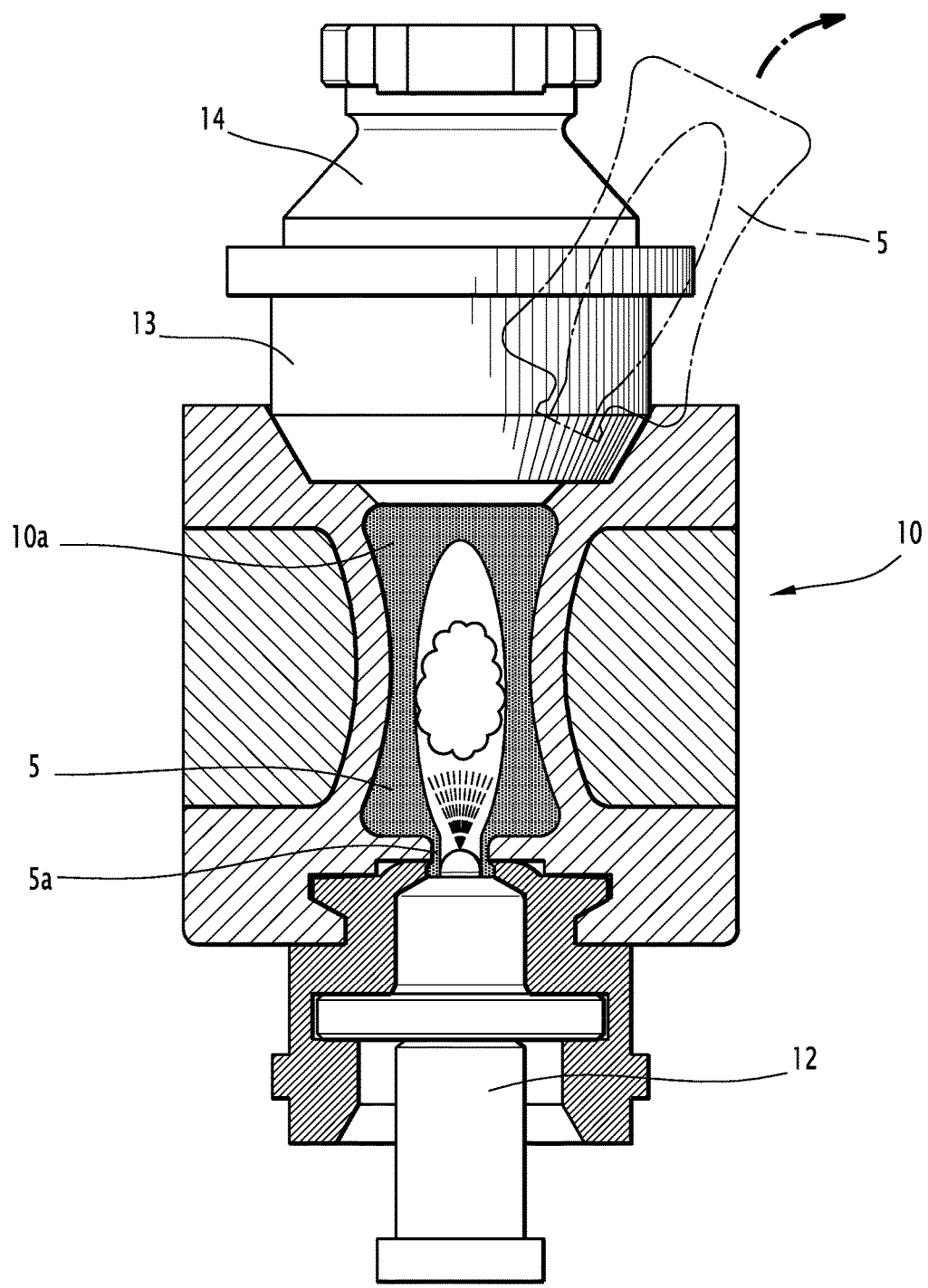

Once the parison 3 is introduced into the cavity 10a of the blank mold 10, a bottom 14 is placed on the funnel 13 on the upper opening of said blank mold, and pressurized air is blown in using the blowing nozzle 12 to settle the glass and form a ring 5a on the blank 5, as shown in FIG. 3. The bottom 14 is next raised to make it possible to remove the funnel 13. This bottom 14 is placed on the top of the blank mold 10, making it possible to shape the bottom of the blank 5, and pressurized air is blown in by the nozzle 12.

The blank 5 of the article 30 is thus obtained.

Figure 4:
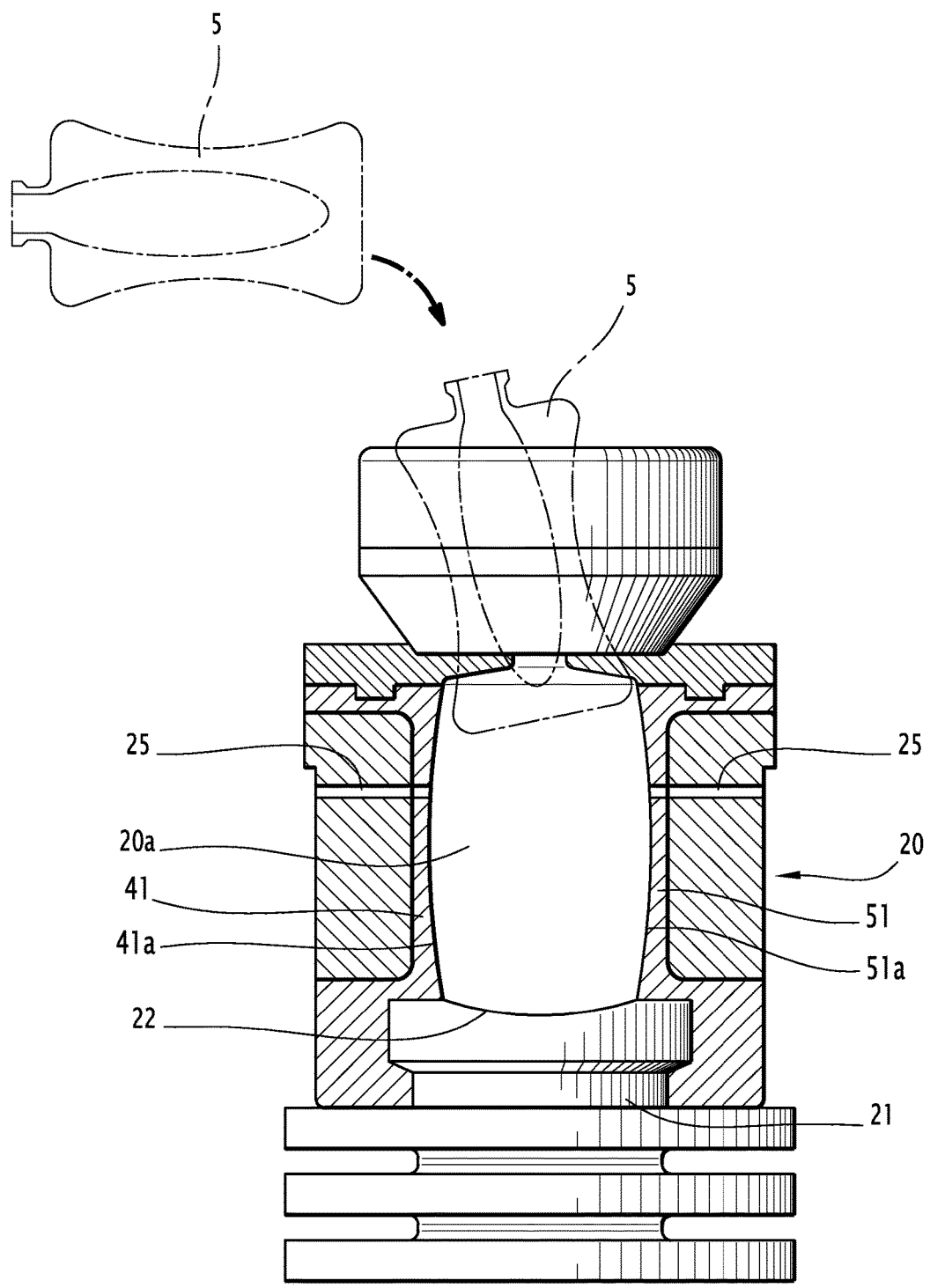
Figure 5:
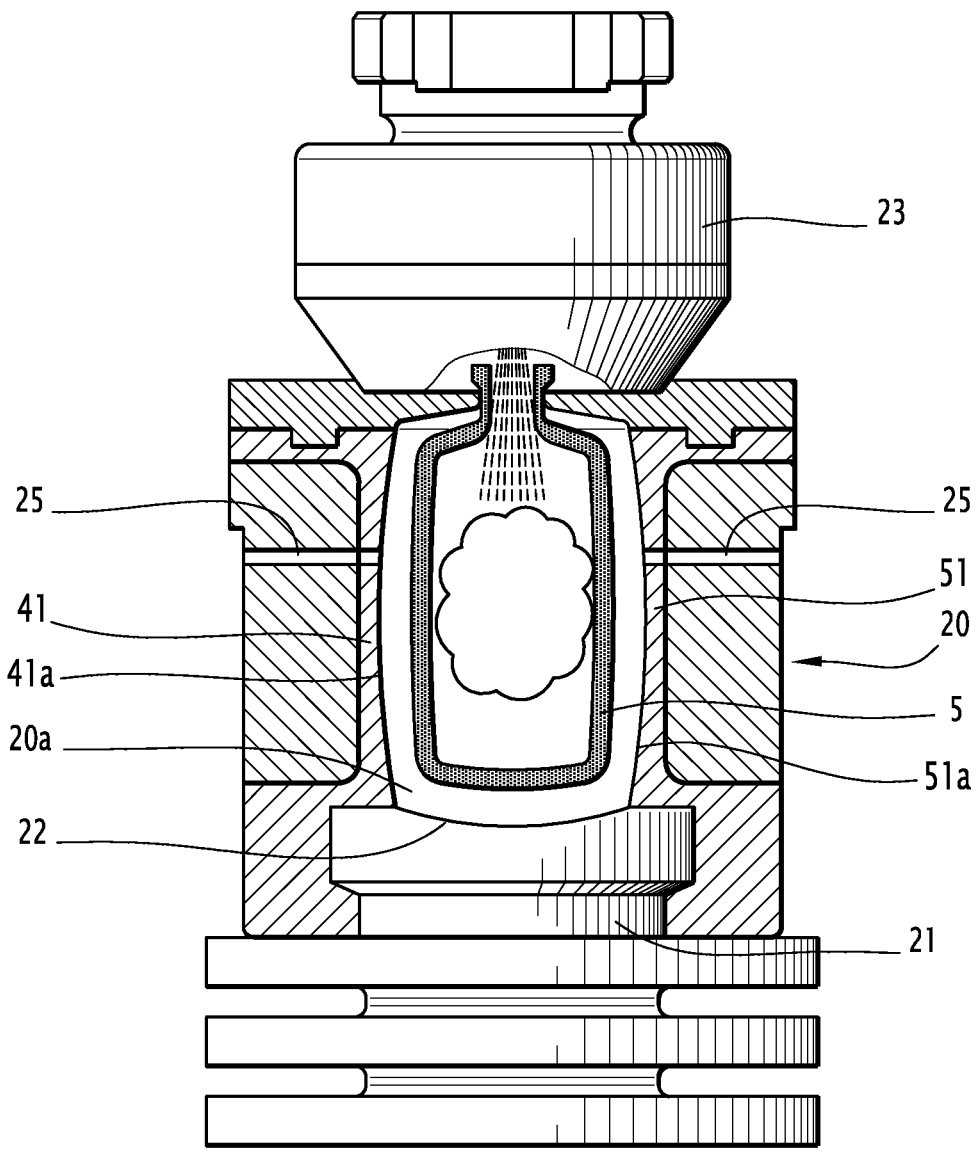
Figure 6:
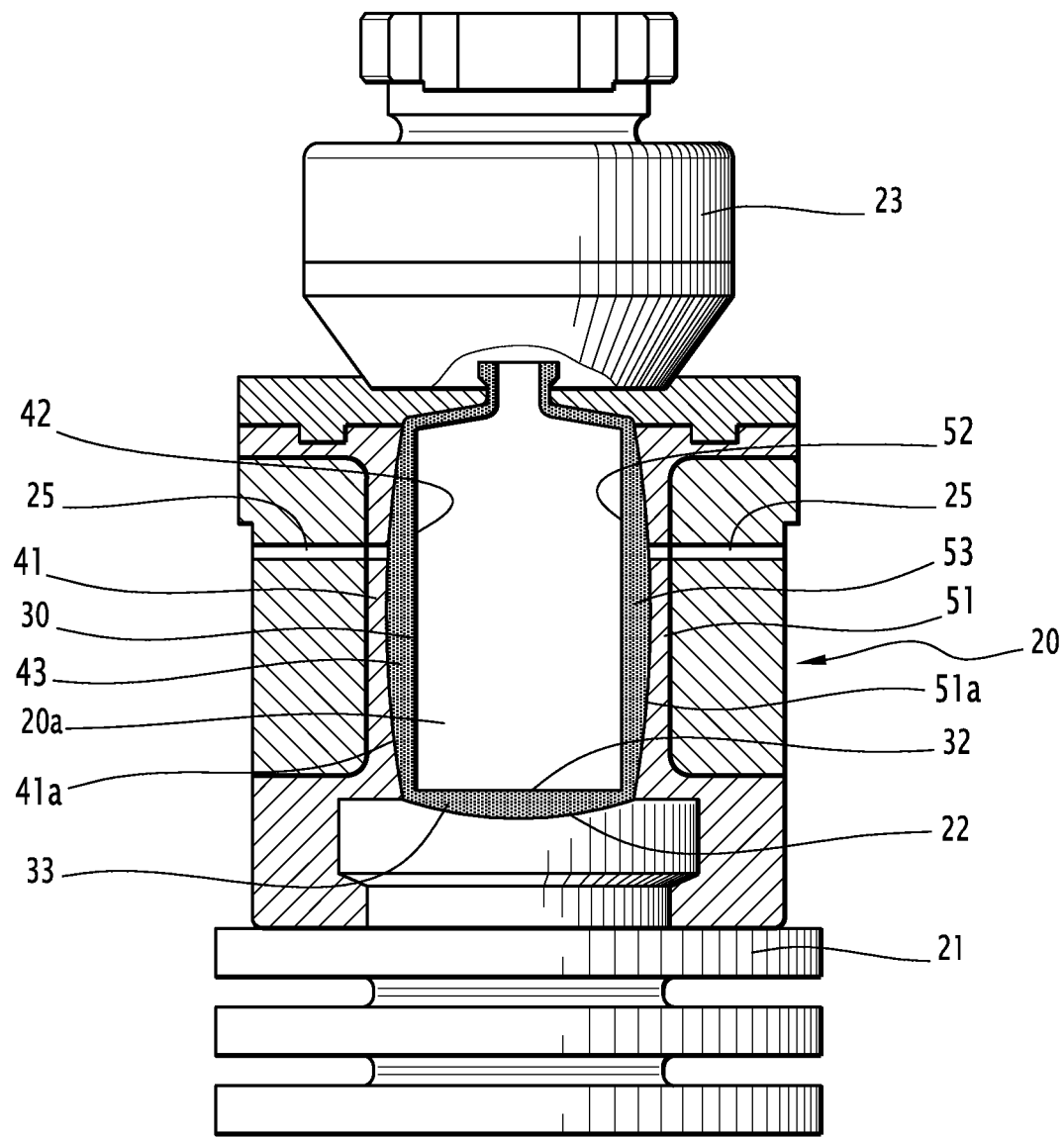

Next, the blank 5 is stripped and transferred by a handling arm 15 (FIG. 1) pivoting around an axis 15a, into a finishing mold 20 shown diagrammatically in FIGS. 4 to 6. This finishing mold 20 comprises a cavity 20a, the lower part of which is closed off by a removable bottom 21. The finishing mold 20 further comprises at least one removable side part 41 that closes off one side of the cavity 20a. Advantageously, the finishing mold 20 comprises a second removable side part 51 that closes off another side of the cavity 20a.

The removable bottom 21 makes it possible to shape the bottom 32 of the article 30 to be obtained, while the two side parts 41, 51 make it possible to shape the two side faces 42, 52. When the side parts 41, 51 and the bottom 21 are joined, together they form the cavity 20a, closed tightly.

As shown in FIGS. 4 to 6, the bottom 21 of the cavity 20a comprises a concave cavity 22 and two concave side cavities 41a, 51a.

When the blank 5 has been introduced into the finishing mold 20 (FIG. 5), a blowing nozzle 23 is mounted on the upper part of the finishing mold 20, said nozzle being connected to a device supplying pressurized gas, for example air, not shown.

After this operation, pressurized gas is blown into the blank 5 so as to form the article 30 (FIG. 6).

Figure 7:
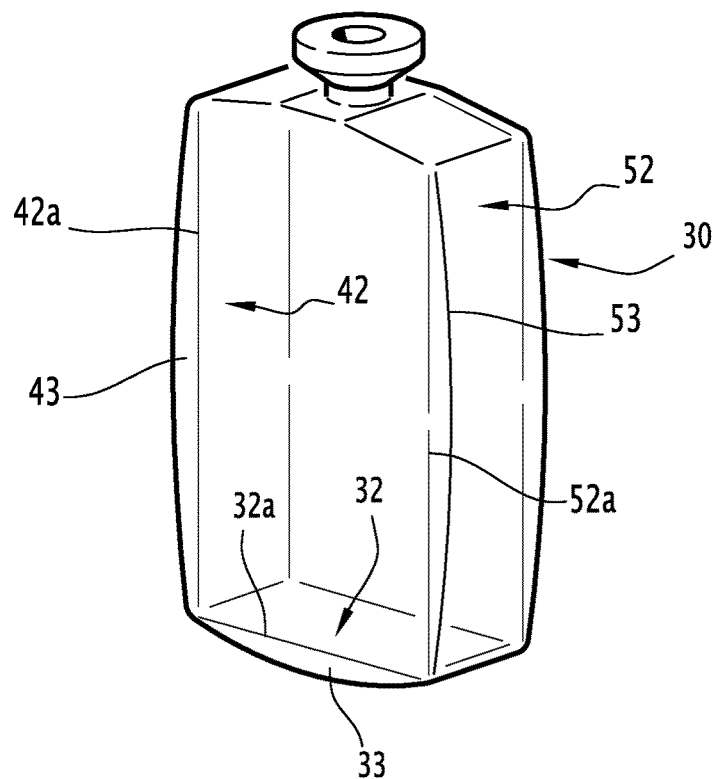
FIG. 7 is a diagrammatic view of a hollow glass article obtained after the forming step in the finishing mold.

During the forming of this article 30 in the finishing mold 20, the excess glass becomes housed in the cavity 22 arranged in the bottom 21 of the finishing mold 20 while forming, towards the exterior of the bottom of the article 30, a convex bulge 33, as shown in FIG. 7. Thus, the inner distribution of the bottom 32 of the article 30 sinks in the cavity 22 and the inner face 32a of the bottom 32 becomes horizontal.

Likewise, during the forming of this article 30 in the finishing mold 20, excess glass becomes housed in the cavities 41a, 51a arranged in the side parts 41, 51 of the finishing mold 20 and forms two convex bulges 43, 53 towards the exterior of the article 30, as shown in FIG. 7.

The distribution of the glass in the side walls 42, 52 of the article 30 equalizes, and the inner faces 42*a*, 52*a* of the side walls 42, 52 become substantially planar and vertical.

The article 30 obtained in the finishing mold 20 is stripped from that finishing mold 20 by removing the removable bottom 21 and separating the side walls 41, 51 from one another.

Next, to eliminate the exterior bulges 33, 43, 53 thus formed, the operators perform three cutting operations, followed by at least three polishing operations for the exterior faces 32*b*, 42*b*, 52*b* of the bottom 32 and the side walls 42, 52 of the article 30, so as to obtain a bottom 32 with a substantially constant thickness and two side faces 42, 52 with a substantially constant thickness, as shown in FIG. 8.

Advantageously, the thickness of the bottom 32 and the thickness of the side walls 42, 52 is constant to within plus or minus 5% relative to their mean thicknesses.

During the forming operation in the finishing mold 20, to allow the gas cushion that forms between the main faces of the blank 5 and the inner walls of the cavity 20*a* of the finishing mold 20 to escape, the finishing mold 20 comprises at least one vent 25 (FIGS. 4 to 6).

In the example embodiment shown in these figures, each vent 25 is formed by a conduit arranged in the walls of the finishing mold 20, advantageously in one or the other of the side parts 41, 51. Each vent 25 inwardly comprises an element allowing the gas to escape and preventing the molten glass from flowing through the vent 25. Each vent 25 may be made up of any other arrangement in the finishing mold 20.

Hot and/or cold chemical treatments may be done on the article 30, so as to reinforce the exterior surface of the glass.

The method according to the invention makes it possible to obtain thin hollow glass articles having a homogenous distribution of the glass and having the required solidity for this type of article, despite the thinness of the side walls and the bottom.

What is claimed is:

1. A process for manufacturing a hollow glass article comprising at least one thin side wall, in which process:
   at least one parison of molten glass is introduced into a blank mold,
   a blank of the article is formed in the blank mold from said at least one parison,
   the blank of the article is transferred into a finishing mold, and
   the article is formed in the finishing mold,
   wherein, during forming of the article in the finishing mold, excess glass is directed towards the exterior of the side wall of the article to form a convex bulge and the bulge is removed to give the side wall of the article a substantially constant thickness.

2. The process according to claim 1, wherein:
   the manufactured hollow article comprises a second thin side wall, and
   during forming of the article in the finishing mold, excess glass is directed towards the exterior of the side wall of the article to form a second convex bulge and the second bulge is removed to give the second side wall of the article a substantially constant thickness.

3. The process according to claim 1, wherein:
   the manufactured hollow article comprises a thin bottom, and
   during forming of the article in the finishing mold, excess glass is directed towards the exterior of the bottom of the article to form a convex bulge and that the bulge is removed to give the bottom of the article a substantially constant thickness.

4. The method according to claim 1, wherein, during forming of the article in the finishing mold, a gas forming between the side wall of the article and an inner wall of the finishing mold is channeled towards the exterior of that finishing mold.

5. The method according to claim 1, wherein the exterior bulge of the side wall of the article is removed by at least one cutting operation, followed by at least one polishing operation for the exterior face of the side wall of the article.

\* \* \* \* \*